United States Patent
Liu (12)

(10) Patent No.: US 9,709,399 B2
(45) Date of Patent: Jul. 18, 2017

(54) APPROACH FOR CONTROL REDISTRIBUTION OF CORIOLIS VIBRATORY GYROSCOPE (CVG) FOR PERFORMANCE IMPROVEMENT

(71) Applicant: The Boeing Company, Chicago, IL (US)

(72) Inventor: John Y. Liu, San Marino, CA (US)

(73) Assignee: THE BOEING COMPANY, Chicago, IL (US)

( * ) Notice: Subject to any disclaimer, the term of this patent is extended or adjusted under 35 U.S.C. 154(b) by 167 days.

(21) Appl. No.: 14/594,893

(22) Filed: Jan. 12, 2015

(65) Prior Publication Data

US 2016/0202059 A1    Jul. 14, 2016

(51) Int. Cl.
| | |
|---|---|
| G01C 19/56 | (2012.01) |
| G01C 19/5776 | (2012.01) |
| G01C 19/5719 | (2012.01) |
| G01C 19/5726 | (2012.01) |
| G01C 19/5705 | (2012.01) |

(52) U.S. Cl.
CPC ......... G01C 19/56 (2013.01); G01C 19/5705 (2013.01); G01C 19/5719 (2013.01); G01C 19/5726 (2013.01); G01C 19/5776 (2013.01)

(58) Field of Classification Search
CPC . G01C 19/5726; G01C 19/5776; G01C 19/56
See application file for complete search history.

(56) References Cited

U.S. PATENT DOCUMENTS

| | | | | |
|---|---|---|---|---|
| 6,267,008 B1* | 7/2001 | Nagao | ............... | G01C 19/5719 |
| | | | | 73/504.12 |
| 6,805,007 B2* | 10/2004 | Fell | .................... | G01C 19/5691 |
| | | | | 73/504.12 |

(Continued)

FOREIGN PATENT DOCUMENTS

EP        2166308 A1    3/2010

OTHER PUBLICATIONS

Author Unknown, IEEE Standard Specification Format Guide and Test Procedure for Coriolis Vibratory Gyros, IEEE Standards 1431, Dec. 20, 2004, pp. 1-79.

(Continued)

*Primary Examiner* — Ryan Walsh
(74) *Attorney, Agent, or Firm* — MH2 Technology Law Group, LLP

(57) ABSTRACT

Provided herein is a Coriolis vibratory gyroscope ("CVG"). The CVG includes a first plurality of actuators electrically coupled to the vibratory member and arranged about a drive axis of the CVG and operable to obtain a control signal from the controller and provide a voltage sufficient to cause and maintain the vibratory member to vibrate in a first mode of oscillation; a second plurality of actuators electrically coupled to the vibratory member and arranged about a sense axis of the CVG and operable to detect a voltage based on a second mode of oscillation of the vibratory member caused by a rotation of the CVG about an axis of rotation and to provide a counter-balancing signal sufficient to null the voltage based on the second mode of oscillation, wherein the controller is operable to determine a rate of the rotation of the CVG based, in part, on the counter-balancing signal.

14 Claims, 6 Drawing Sheets

(56) References Cited

U.S. PATENT DOCUMENTS

| | | | |
|---|---|---|---|
| 7,617,727 B2* | 11/2009 | Watson | G01C 19/5691 |
| | | | 73/504.13 |
| 2007/0028686 A1* | 2/2007 | Wyse | G01C 19/5719 |
| | | | 73/504.12 |
| 2007/0240508 A1 | 10/2007 | Watson | |
| 2008/0000296 A1* | 1/2008 | Johnson | G01C 19/5719 |
| | | | 73/514.18 |
| 2013/0179105 A1* | 7/2013 | Liu | G01C 25/005 |
| | | | 702/87 |
| 2014/0000365 A1* | 1/2014 | Aaltonen | G01C 19/5776 |
| | | | 73/504.12 |
| 2015/0377623 A1* | 12/2015 | Waters | G01C 19/5705 |
| | | | 73/504.12 |
| 2016/0202060 A1* | 7/2016 | Liu | G01C 19/5705 |
| | | | 73/504.12 |

OTHER PUBLICATIONS

Search Report for European Appl. No. 16150710.8 dated Jul. 22, 2016.

* cited by examiner

APPROACH FOR CONTROL REDISTRIBUTION OF CORIOLIS VIBRATORY GYROSCOPE (CVG) FOR PERFORMANCE IMPROVEMENT

FIELD

The present disclosure relates generally to vibratory gyroscopes and, in particular, to a method and apparatus for electronically compensating for bias in vibratory gyroscopes.

BACKGROUND

Gyroscopes are used for measuring and/or maintaining orientation. As used herein, a "gyroscope" is a sensor configured to detect and measure the angular motion of an object relative to an inertial frame of reference. Further, as used herein, an "inertial frame of reference" may be a coordinate system or set of axes that is non-accelerating. In other words, an inertial frame of reference is a frame of reference in which Newton's first law of motion is true. Newton's first law of motion states that the velocity of a body remains constant unless the body is acted upon by an external force.

A Coriolis vibratory gyroscope ("CVG") is configured to be driven to vibrate along a first axis. Vibration along the first axis while the Coriolis vibratory gyroscope is being rotated about a fixed input axis not co-aligned with the drive axis, for example, perpendicular to the drive axis, generates a Coriolis force that induces vibrations along a second axis. These vibrations may be measured and used to determine an angular velocity for the rotation of the Coriolis vibratory gyroscope about the fixed input axis.

However, bias may contribute to the measurements of the angular velocity. Bias may be the error in the measurements due to factors such as, for example, without limitation, temperature, part inconsistencies, and other suitable factors. Calibration of these gyroscopes during manufacturing of the gyroscopes may be less accurate than desired.

For example, calibration of these gyroscopes during manufacturing processes may use test data as compared to substantially real-time data. In particular, these calibration techniques may not take into account the effects of the temperature in the environment in which a gyroscope is being operated and/or inconsistencies that may develop over time from the time at which the gyroscope was manufactured. Further, some currently available systems for compensating for this bias may be unable to reduce the bias from these vibration measurements to within selected tolerances.

Therefore, it would be desirable to have a method and apparatus that takes into account one or more of the issues discussed above as well as possibly other issues.

SUMMARY

In accordance with aspects of the present disclosure, a Coriolis vibratory gyroscope ("CVG") is disclosed. The CVG can comprise a vibratory member; a controller; a first plurality of actuators electrically coupled to the vibratory member and arranged about a drive axis of the CVG and operable to obtain a control signal from the controller and provide a voltage sufficient to cause and maintain the vibratory member to vibrate in a first mode of oscillation; a second plurality of actuators electrically coupled to the vibratory member and arranged about a sense axis of the CVG and operable to detect a voltage based on a second mode of oscillation of the vibratory member caused by a rotation of the CVG about an axis of rotation and to provide a counter-balancing signal sufficient to null the voltage based on the second mode of oscillation, wherein the sense axis is orthogonal to the drive axis in a modal reference frame, wherein the controller is operable to determine a rate of the rotation of the CVG based, in part, on the counter-balancing signal.

In some aspects, the vibratory member is symmetric relative to the sense and the drive axes.

In some aspects, the controller is operable to modify the control signal to one or more of the first plurality of actuators by a corresponding plurality of first weighting factors. For example, for the two actuator case about either the drive and/or sense axis, there can be two weighting factors, determined by one independent parameter. For the general case of n-actuators, there can be n weighting factors to adjust, with the choice of those weighting factors being subject to certain constraints to maintain the aggregated actuation effort.

In some aspects, the controller is operable to modify the counter-balancing signal to one or more of the second plurality of actuators by a corresponding plurality of second weighting factors to compensate for misalignments in placement of one or more of the second plurality of actuators relative to the vibratory member.

In some aspects, the controller is operable to preset one or more of the corresponding plurality of first weighting factors and one or more of the corresponding plurality of the second weighting factors by a same amount.

In some aspects, the controller is operable to adjust one or more of the corresponding plurality of first weighting factors based on a detected misalignment between the control signal and a voltage measured at a pickoff associated with the drive axis.

In some aspects, the controller is operable to adjust the one or more of the corresponding plurality of first weighting factors such that a bias caused by a physical misalignment of drive axis and damping asymmetry of the CVG is minimized or eliminated.

In some aspects, the controller is operable to adjust one or more of the corresponding plurality of second weighting factors such that a bias caused by a physical misalignment of sense axis and damping asymmetry of the CVG is minimized or eliminated.

In some aspects of the present disclosure, a method of compensating for bias in a Coriolis vibratory gyroscope ("CVG") is disclosed. The CVG comprising a vibratory member, a controller, a first plurality of actuators coupled to the vibratory member and arranged about a drive axis of the CVG, and a second plurality of actuators coupled to the vibratory member and arranged about a sense axis of the CVG, wherein the drive axis and the sense axis are orthogonal to each other in a modal reference frame. The method comprises obtaining, from the controller, a first control signal from the controller to provide a voltage sufficient to cause and maintain the vibratory member to vibrate in a first mode of oscillation; detecting, by the controller, a voltage based on a second mode of oscillation of the vibratory member caused by a rotation of the CVG about an axis of rotation; providing, by the controller, a counter-balancing signal sufficient to null the voltage based on the second mode of oscillation; and determining, by the controller, a rate of the rotation of the CVG based, in part, on the counter-balancing signal.

In some aspects, the method further comprises modifying, by the controller, the control signal to one or more of the first plurality of actuators by a corresponding plurality of first weighting factors to compensate for misalignments in placement of one or more of the first plurality of actuators relative to the vibratory member.

In some aspects, the method further comprises modifying, by the controller, the counter-balancing signal to one or more of the second plurality of actuators by a corresponding plurality of second weighting factors to compensate for misalignments in placement of one or more of the second plurality of actuators relative to the vibratory member.

In some aspects, the method further comprises setting, by the controller, one or more of the corresponding plurality of first weighting factors and one or more of the corresponding plurality of second weighting factors to a same amount.

In some aspects, the method further comprises adjusting, by the controller, one or more of the corresponding plurality of first weighting factors based on a detected misalignment between the control signal and a voltage measured at a pickoff associated with the drive axis.

In some aspects, the method further comprises adjusting, by the controller, one or more of the corresponding plurality of first weighting factors such that a bias caused by a physical misalignment and damping asymmetry of the CVG is minimized or eliminated.

In some aspects, the method further comprises adjusting, by the controller, one or more of the corresponding plurality of second weighting factors such that a bias caused by a physical misalignment and damping asymmetry of the CVG is minimized or eliminated.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
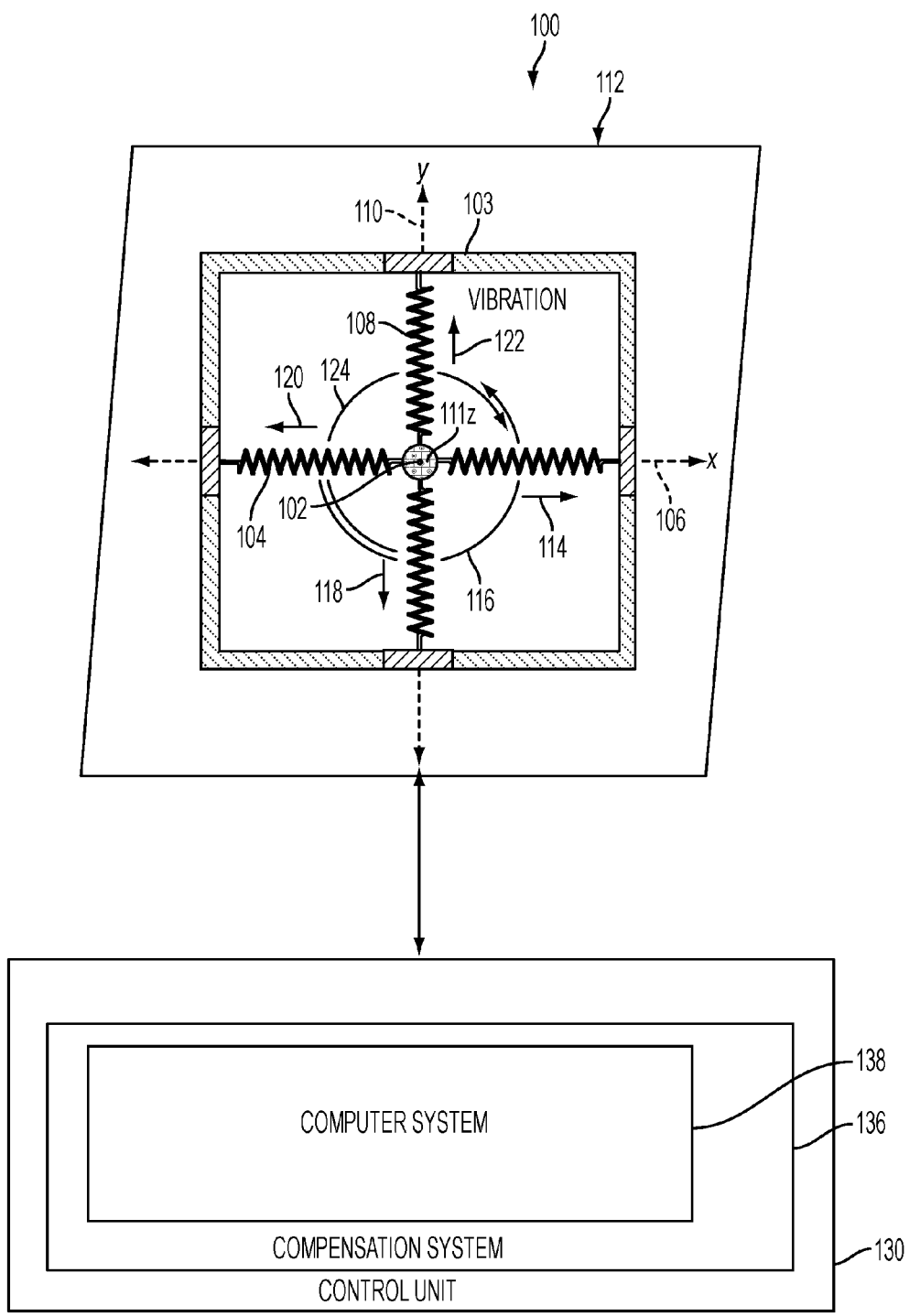
FIG. 1 is an illustration of a functional model for a gyroscope in accordance with an illustrative embodiment.

Reference will now be made in detail to exemplary embodiments of the present teachings, which are illustrated in the accompanying drawings. Where possible the same reference numbers will be used throughout the drawings to refer to the same or like parts.

According the present teachings, a design of actuators in a CVG and a method to reduce or eliminate the impact of actuation/pickoff misalignment as well as damping asymmetry on gyro performance is disclosed, with the following features: (1) design multiple actuators that can be individually adjusted for both the drive (automatic gain control ("AGC") and sense (force-to-rebalance ("FTR")) channels; (2) estimate the effect of the misalignment; and (3) redistribute the actuation signals among multiple actuators for both drive and sense channels of a CVG. The last two actions can be performed in gyro testing/calibration phase and/or gyro operation phase. The benefits include improved gyro performance that is difficult to achieve via previously known approaches.

One of the tasks to improve a CVG's performance is mechanical and electronic trimming of the CVG structure. Material non-uniformity, mass property imbalance, structure shape errors, and actuation/sensing device placements errors can all contribute to stiffness asymmetry, damping asymmetry and principal axis misalignments. In particular, under the condition of perfect demodulation of FTR signal and zero quadrature bias, the CVG damping asymmetry and actuation and the pickoff misalignment of the drive (AGC) and sense (FTR) channels are the main contributors to gyro bias. A design is provided herein of distributed actuation devices that can be manipulated so that the effect of the damping asymmetry and misalignments can be eliminated. Also, a method for reducing or eliminating effects of misalignment and damping asymmetry on CVG bias performance is provided herein comprising: designing multiple actuators that can be individually adjusted for both the drive and sense channels, estimating the effect of misalignments and damping asymmetry, and redistributing a plurality of actuation signals among multiple actuators for both drive and sense channels of the CVG to correct for the effect of misalignments and damping asymmetry on gyro bias.

A typical CVG employs an automatic gain control (AGC) loop to maintain a constant mode of vibration while the force-to-rebalance (FTR) loop detects the inertial rate. Various factors contribute to gyro bias which is typically calibrated using external aiding. Separately, the mode switching (or reversing) of a CVG has been shown to reverse the sign of bias from certain contributors, but the mode switching approach has limited effect on reducing actuation/pickoff misalignment induced gyro biases.

In general, a gyroscope sensor measures the rate of rotation of the object. Vibrating gyroscopes are typically driven at resonance in order to function as angular rate sensors. This direction is referred as the drive direction. When the device is rotated along the rotation axis, a Coriolis force is induced in the sense direction into resonance mode. The sense direction is orthogonal to both the drive and the rotation axis. Hence the gyroscope can be viewed as two-degrees-of freedom (2 DOF) mass spring damper system whereby, one degree of freedom is the drive direction and the second degree of freedom orthogonal to the first is the sense direction.

With reference now to FIG. 1, an illustration of a functional model for a gyroscope is depicted in accordance with an illustrative embodiment. In this illustrative example, model 100 includes element 102 and frame 103. Of course, in other illustrative examples, model 100 may include other components for the gyroscope in addition to the ones described in FIG. 1.

Element 102 is associated with frame 103 by first set of springs 104 along the direction of x-axis 106. Element 102 is associated with frame 103 by second set of springs 108 along the direction of y-axis 110. As depicted, x-axis 106 and y-axis 110 are used to form plane 112. Element 102 may be configured to vibrate, or resonate, at number of resonant frequencies for element 102. In some cases, number of resonant frequencies may be substantially equal to number of natural frequencies for element 102. A natural frequency in number of natural frequencies may be the frequency at which element 102 vibrates along a particular axis when a substantially continuous external force is not being applied to element 102. In this illustrative example, element 102 may be referred to as a "proof mass" or a resonator in some illustrative examples.

Element 102 may vibrate along x-axis 106 at a first natural frequency. Further, element 102 may vibrate along y-axis 110 at a second natural frequency. The first natural frequency may be the same or different from the second natural frequency, depending on the implementation. Vibration of element 102 along x-axis 106 may be a first mode, while vibration of element 102 along y-axis 110 may be a second mode. The first mode and the second mode may be referred to as, for example, a drive mode and a sense mode, respectively.

Element 102 may vibrate along x-axis 106 and/or y-axis 110 independently of movement of frame 103 in this illustrative example. In particular, first set of springs 104 and second set of springs 108 may allow element 102 to move along x-axis 106 and y-axis 110 independently of the movement of frame 103.

Motion of element 102 is constrained to within plane 112 in this illustrative example. In one illustrative example, control unit 130 may drive element 102 to vibrate along the direction of x-axis 106. Frame 103 may be rotated about a z-axis 111 that is substantially perpendicular to plane 112. Rotation of frame 103 about z-axis 111 while element 102 is moved along the direction of x-axis 106 generates a Coriolis force that causes element 102 to vibrate along the direction of y-axis 110.

For example, referring to FIG. 1, if element 102 is moved in the direction of arrow 114 along x-axis 106 while frame 103 is rotated about z-axis 111 in the direction of arrow 116, element 102 may be moved in the direction of arrow 118 along y-axis 110. If element 102 is moved in the direction of arrow 120 along x-axis 106 while frame 103 is rotated about z-axis 111 in the direction of arrow 116, element 102 may be moved in the direction of arrow 122 along y-axis 110.

Similarly, if element 102 is moved in the direction of arrow 114 along x-axis 106 while frame 103 is rotated about z-axis 111 in the direction of arrow 124, element 102 may be moved in the direction of arrow 122 along y-axis 110. If element 102 is moved in the direction of arrow 120 along x-axis 106 while frame 103 is rotated about z-axis 111 in the direction of arrow 124, element 102 may be moved in the direction of arrow 118 along y-axis 110.

Control unit 130 uses one or more force rebalance signals to cause the amplitude of vibrations of element 102 along second axis, i.e., y-axis 110, to be substantially zero. In other words, control unit 130 uses the one or more force rebalance signals to substantially nullify the movement of element 102 along second axis, i.e., y-axis 110, based on the measured second mode motion due to the Coriolis coupling from the first mode motion. Control unit 130 generates one or more measurements of the one or more force rebalance signals. The one or more measurements of the force rebalance signals may be used to determine an angular velocity.

The one or more measurements may be less accurate than desired when bias of gyroscope contributes to the one or more measurements. Bias is an error for gyroscope. For example, bias can be the difference between the one or more measurements and the one or more measurements that should actually be generated. Bias may be the contribution to the one or more measurements when angular velocity is substantially zero. In this manner, bias may be referred to as a zero-rate bias. Bias may be caused by a number of different factors. These factors may include, for example, without limitation, temperature, inconsistencies in the fabrication of the different components for element 102, characteristics of element 102, characteristics of a sensing system in gyroscope, characteristics of control unit 130, and other suitable factors. These factors also may include damping and stiffness asymmetry between the two principal damping axes and principal stiffness axes, nominal drive axis and sense axis alignment, if different than the first axis and second axis, actuation/pickoff axis misalignments within the drive axis and sense axis, and/or other suitable types of asymmetry.

Compensation system 136 may be used to electronically compensate for the bias. Compensation system 136 may be implemented using hardware, software, or a combination of the two. For example, compensation system 136 may be implemented within computer system 138. Computer system 138 may comprise a number of computers. When computer system 138 comprises more than one computer, these computers may be in communication with each other.

Figure 2:
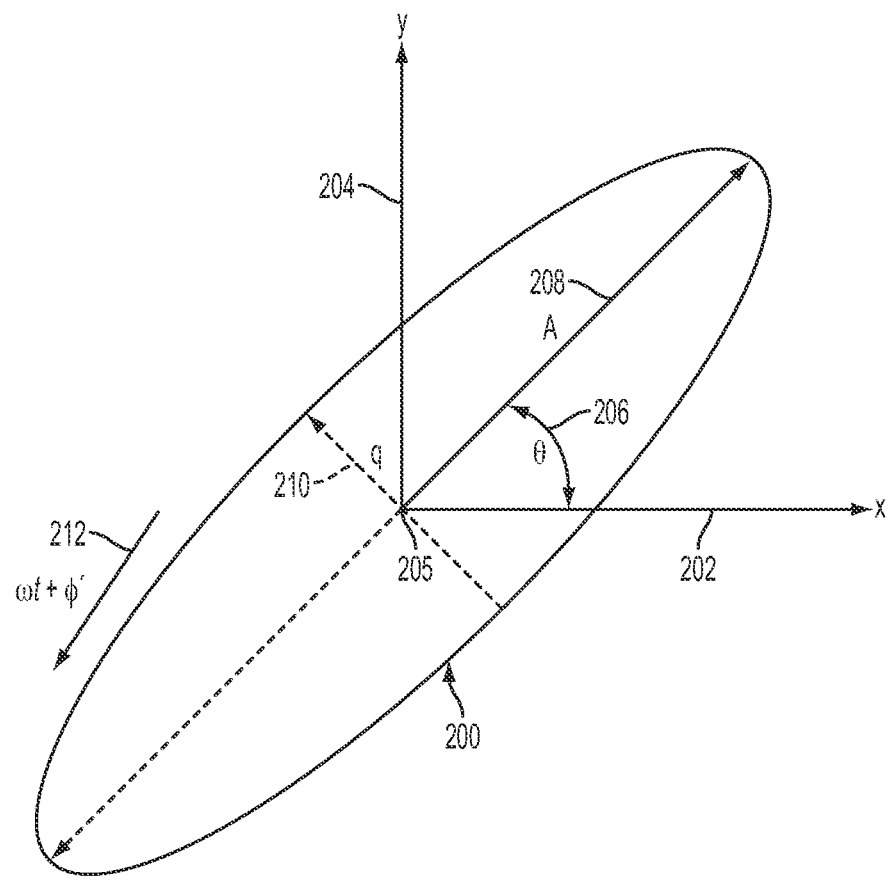
FIG. 2 is an illustration of the orbit of an element for a gyroscope in accordance with an illustrative embodiment.

With reference now to FIG. 2, an illustration of the orbit of an element for a gyroscope is depicted in accordance with an illustrative embodiment. In this illustrative example, orbit 200 of an element, such as element 102 from FIG. 1, is depicted with respect to x-axis 202 and y-axis 204. X-axis 202 is the same as x-axis 106 in FIG. 2. Y-axis is the same as y-axis 110 in FIG. 1.

Element 102 may oscillate about origin 205 at the intersection of x-axis 202 and y-axis 204. Oscillation of element 102 may follow a pendulum-type behavior. In this manner, orbit 200 may be a pendulum orbit in this illustrative example.

Parameters for orbit 200 include pendulum angle 206, principal amplitude 208, quadrature amplitude 210, and phase 212. As depicted, pendulum angle 206, $\vartheta$, is an angle with respect to x-axis 202 and defines an axis relative to x-axis 202 along which element 102 may vibrate. Principal amplitude 208, A, is the amplitude of vibrations for element 102 along the axis defined by pendulum angle 206.

Quadrature amplitude 210, q, is the amplitude of vibrations for element 102 along the axis in-quadrature to the axis defined by pendulum angle 206. In other words, quadrature amplitude 210 is the amplitude of vibrations for element 102 along the axis substantially orthogonal to the axis defined by pendulum angle 206. Further, phase 212, $\phi'$, is the phase for orbit 200.

A control unit, such as control unit 130 in FIG. 1, may be configured to control external force components applied to element 102 and/or frame 103 in FIG. 1 to control pendulum angle 206, principal amplitude 208, quadrature amplitude 210, and phase 212. For example, the control unit may control forces exerted on element 102 such that these forces have a same phase as the phase of the natural frequency for element 102.

Further, the control unit may control forces exerted on element 102 such that principal amplitude 208, A, remains substantially constant during operation of the gyroscope against any damping forces. The rate at which principal amplitude 208, A, decreases because of damping is proportional to A/$\tau$, in which $\tau$ is a damping time constant. Additionally, the control unit may control the forces exerted on element 102 such that pendulum angle 206 and quadrature amplitude 210 remain substantially zero with selected tolerances during operation of the gyroscope.

Figure 3:
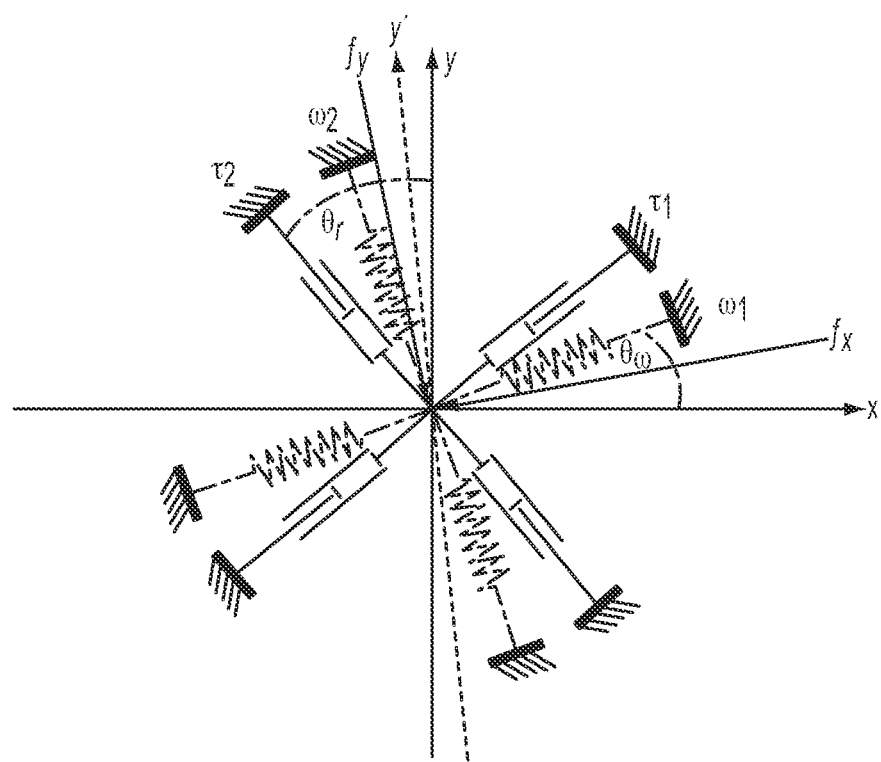
FIG. 3 shows an example CVG model, according to the present teachings.

FIG. 3 shows an example CVG model according to the present teachings. A first coordinate system (+x to the right, +y upward, +z out of the page (axis of rotation). The CVG model is shown represented in modal space (aka modal reference frame or modal coordinate system) with modal coordinates (aka generalized or principal coordinates) where the vibration mode about the drive (x-axis), $\omega_1$, and the vibration mode produced as a result of the rotation of the CVG about the sense (y-axis), $\omega_2$, are offset by 90°. In physical space (not shown) the two modes of vibration, $\omega_1$ and $\omega_2$, would be offset by 45°. The axis y' shown by a dotted line represents a misalignment of the nominal sense axis from the nominal drive axis. For example, the nominal axes of the drive and sense axes can be defined as the pickoff axes of the drive and sense axes. As discussed above, the CVG can be represented as a 2 DOF mass spring damper system. Because of the damped system (represented by $\tau_1$ and $\tau_2$), the CVG requires an input force to maintain the vibrating member of the CVG vibrating in a constant vibration mode. The actuators around the drive axis provide this needed input. With closed-loop FTR control, the actuators around the sense axis contain information related to the angular speed. While the CVG is not undergoing rotation about the z-axis, the vibration of the vibrating member tends to stay in $\omega_1$ direction. However, if the CVG rotates, the vibration in $\omega_1$ direction tends to get coupled into $\omega_2$ direction, which can then be detected by a sensor located around the sense axis. Additionally or alternatively, the rotation rate can be measure by a process whereby the a control signal is provided to zero out the $\omega_2$ motion (force to rebalance) that is opposite the force in the $\omega_2$ direction. The CVG can be designed such that $\omega_1$ and $\omega_2$ are made to be as close as possible during manufacture, such as about within 5%, or within 3%, or within 2%, or within 1% of each other. Because of inherent difficulties in the arrangement of the various actuators in the CVG, the force for the AGC ($f_x$) provided to the actuators is offset from the pickoff direction of the drive axis, as shown in FIG. 3. Likewise, the FTR ($f_y$) is also offset from the pickoff direction of the sense axis, as also shown in FIG. 1

Figure 4:
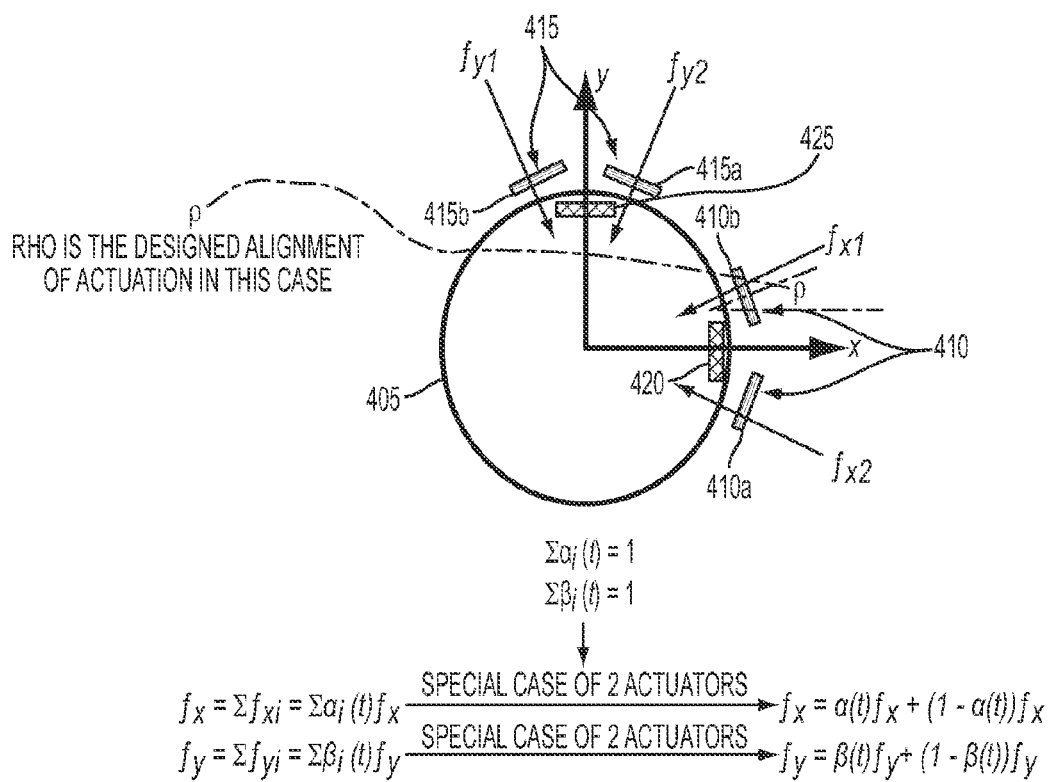
FIG. 4 shows an example arrangement of a first plurality of actuators operable to maintain the vibrating member of the CVG to vibrate at a constant amplitude in a first vibration mode and a second plurality of actuators operable to offset the force due to the Coriolis effect caused by rotation of the CVG about an axis of rotation, according to the present teachings.

FIG. 4 shows an example arrangement of a first plurality of actuators 410 operable to maintain the vibrating member 405 of the CVG to vibrate at a constant amplitude in a first vibration mode (AGC) and a second plurality of actuators 415 operable to offset the force due to the Coriolis effect caused by rotation of the CVG about the z-axis (axis of rotation) (FTR). As shown, the vibrating member 405 is in the form of a ring; however, other arrangements may be used. The arrangement is shown with respect to a coordinate system, where +x to the right hand side of the figure is the drive axis, +y in the upward direction is the sense axis, and +z is the axis of rotation and is out of the page. Of the first plurality of actuators 410, two actuators 410a, 410b are shown in FIG. 4 merely for ease of explanation. Similarly, two actuators 415a, 415b of the second plurality of actuators 415 is also shown; however, the first plurality of actuators 410 and the second plurality of actuators 415 can include more than two actuators depending on the particular application and requirements of the gyroscope. Actuators 410a, 410b are arranged about and offset from the drive axis. For example, actuator 410a can be offset from the drive axis by an angular distance ρ. The other actuators 410b, 415a, and 415b can be similarly offset from either the drive or sense axis by ρ. The voltage along the drive axis can be measured by sensor (pickoff for drive axis (AGC)) 420 and the voltage along the sense axis can be measured by sensor (pickoff for sense axis (FTR)) 425.

Because of misalignments in the placements in one or more of the first plurality of actuators, changes in shape of the vibrating member 405 due to temperature, material non-uniformity of the vibrating member 405, etc., the voltage that is applied to each actuator 410a, 410b of the first plurality of actuators 410, and thus the force ($f_x$) to maintain the vibrational mode of the vibrating member in the AGC may not be evenly distributed between each of the actuators 410a, 410b. Therefore, the voltage supplied to each actuator 410a, 410b, and thus the ACG for each actuator $f_{x1}$, $f_{x2}$ may need to be continuously monitored and controlled. A first weighing factor a can be used to adjust the voltage supplied to each actuator 410a, 410b. Similarly, the voltage that is applied to each actuator 415a, 415b of the second plurality of actuators 415, and thus the force to rebalance ($f_y$) and offset the Coriolis force produced by rotation of the CVG about the axis of rotation may not be evenly distributed between each of the actuators 415a, 415b. Therefore, the voltage supplied to each actuator 415a, 415b, and thus the FTR for each actuator $f_{y1}$, $f_{y2}$ may also need to be continuously monitored and controlled. A second weighing factor β can be used to adjust the voltage supplied to each actuator 415a, 415b. The first weighting factor a and the second weighing factor β can be respectively represented by the following :

$$\Sigma \alpha_i(t)=1 \quad (1)$$

$$\Sigma \beta_i(t)=1 \quad (2)$$

The total force for the AGC ($f_x$) for the case of two actuators can be represented by:

$$f_x=\Sigma f_{xi}=\Sigma \alpha_i(t)f_x \rightarrow f_x=\alpha(t)f_x+(1-\alpha(t))f_x \quad (3)$$

The total force to rebalance (FTR) ($f_y$) for the case of two actuators can be represented by:

$$f_y=\Sigma f_{yi}=\Sigma \beta_i(t)f_y \rightarrow f_y=\beta(t)f_y+(1-\beta(t))f_y \quad (4)$$

Figure 5:
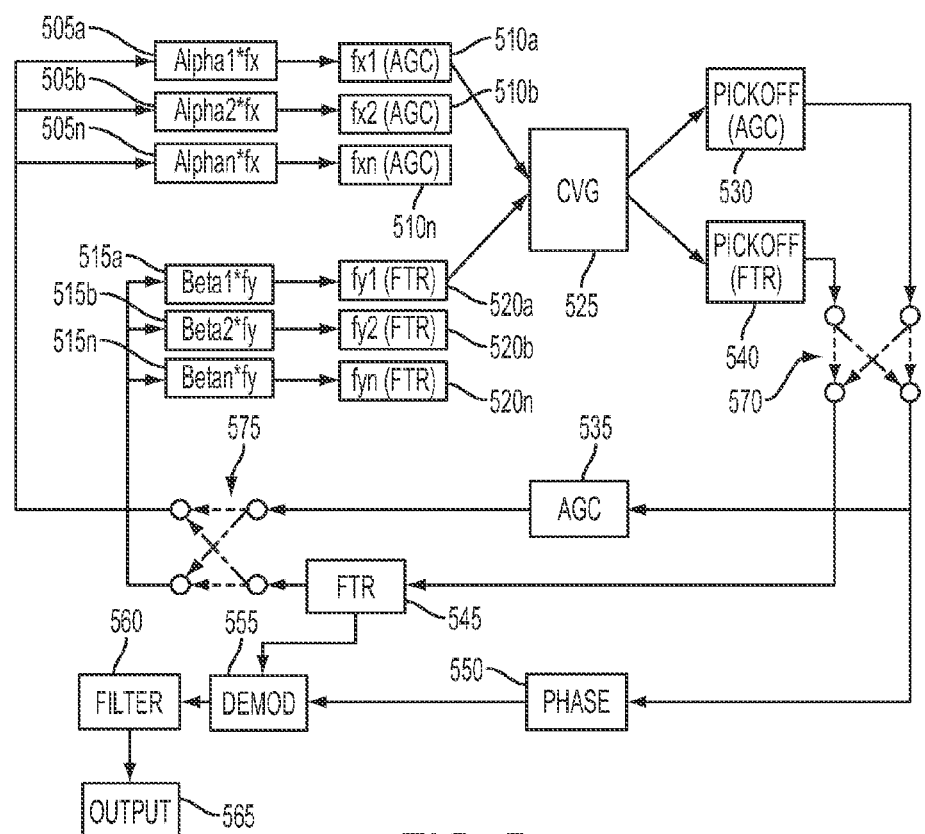
FIG. 5 shows an example closed loop control loop for CVG control with distributed actuation to at least reduce and potentially eliminate the effect of actuation/pickoff misalignment, according to the present teachings.

FIG. 5 shows an example closed loop control loop for CVG control with distributed actuation to at least reduce and potentially eliminate the effect of actuation/pickoff misalignment according to the present teachings. The CVG receives a first set of inputs related to the automatic gain control (AGC) that is applied to a first plurality of actuators to maintain the vibrating member of the CVG to vibrate at a constant amplitude in a first vibration mode ($\omega_1$) and a second set of inputs related to the force to rebalance (FTR) that is applied to a second plurality of actuators to offset the force due to the Coriolis effect caused by rotation of the CVG about the z-axis (axis of rotation).

The first set of inputs, 505a, 505b, and 505n, are voltages that are applied to drive actuators 405a and 405b (actuator for input 505n not shown), as shown in FIG. 4, to produce a force to cause vibrating member of CVG 525 to vibrate in a first vibration mode ($\omega_1$). The total force along the x-axis ($f_x$) produced by the total of each actuator 405a and 405b can be modified by a corresponding weighting factor ($\alpha_1$, $\alpha_2$, . . . , $\alpha_n$) to yield the voltage to cause a force, 510a, 510b, 510n, for each actuator at 405a and 405b to maintain a constant amplitude of the first vibration mode ($\omega_1$).

The second set of inputs, 515a, 515b, and 515n, are voltages that are applied to sense actuators 415a and 415b (actuator for input 515n not shown), as shown in FIG. 4, to produce a force to counter the force produce by the Coriolis effect that causes vibrating member to vibrate in a second vibration mode ($\omega_2$) when subject to a rotation about the z-axis. The total counter-balancing force along the y-axis ($f_y$) provided to the total of each actuator 415a and 415b (inputs 515a, 515b, and 515n) can be modified by a corresponding weighting factor ($\beta_1$, $\beta_2$, . . . , $\beta_n$) to yield the voltage to produce a counter-balancing force, 520a, 520b, 520n, for each actuator at 415a and 415b, to maintain a constant amplitude of the second vibration mode ($\omega_2$).

A first switch 570 and a second switch 575 can be arranged to receive and switch the output voltages from 530 and 540 to provide the mode switching functionality, as described in FIG. 6 A voltage 530 is measured at pickoff 420 for drive axis and is provided to AGC 535 to be provided as inputs in 505a, 505b, 505n. A voltage 540 is measured at pickoff 425 for sense axis and is provided to FTR 545 to be provided as inputs in 515a, 515b, 515n. If the phase of the voltage 530 measured at pickoff for drive axis is out of phase, a phase module 550 can correct for phase offsets in voltage 430. Demodulation module 555 obtains the phase information from phase module 550 and the voltage from FTR 545 to produce a demodulated voltage that is then filtered by filter 560. The angular velocity of the CVG can then be obtained and outputted 565.

The modulated FTR signal with misalignment $\alpha$ between the AGC actuation and pickoff can be represented as:

$$FTR_{mod} = \Delta\left(\frac{1}{\tau}\right)\sin(2\theta_\tau) - \frac{2\sin(a)}{\tau} + 2k\Omega - \Delta\left(\frac{1}{\tau}\right)\cos(2\theta_\tau)\sin(a) \quad (5)$$

$$\approx \Delta\left(\frac{1}{\tau}\right)\sin(2\theta_\tau) - \frac{2a}{\tau} + 2k\Omega \quad (6)$$

If inertial rate is known (for factory calibration), the bias can be measured:

$$B = \frac{1}{2k}\left[\Delta\left(\frac{1}{\tau}\right)\sin(2\theta_\tau)\right] - \frac{2a}{\tau} \quad (7)$$

Intentionally redistribute the actuation of AGC control as follows:

$$f_{AGC,x} = [\alpha\cos\rho + (1-\alpha)\cos\rho]f_x = [\cos\rho]f_x \quad (8)$$

$$f_{AGC,y} = [\alpha\sin\rho - (1-\alpha)\sin\rho]f_x = [(2\alpha-1)\sin\rho]f_x \quad (9)$$

So the AGC actuation (control) has an intentional misalignment to compensate for the physical misalignment and damping asymmetry induced bias:

$$\bar{a} = \frac{(2\alpha-1)\sin\rho}{\cos\rho} \rightarrow \alpha = \frac{1}{2}\left(\frac{\bar{a}}{\tan\rho} + 1\right) \quad (10)$$

Effective misalignment (combined physical and intentional) by varying alpha (and $\bar{a}$) such that $$\left[\Delta\left(\frac{1}{\tau}\right)\sin(2\theta_\tau) - \frac{2(a-\bar{a})}{\tau}\right] = 0 \rightarrow B = 0 \quad (11)$$

The sense actuation/pickoff misalignment can be similarly obtained by mode reversing technique where the drive angles are switched by 90°. In this case, if the misalignment is b:

$$FTR_{mod} \approx -\Delta\left(\frac{1}{\tau}\right)\sin(2\theta_\tau) + \frac{2b}{\tau} + 2k\Omega \quad (12)$$

If inertial rate is known (for factory calibration), the bias can be measured:

$$B = \frac{1}{2k}\left[-\Delta\left(\frac{1}{\tau}\right)\sin(2\theta_\tau) + \frac{2b}{\tau}\right] \quad (13)$$

So the AGC (control) has an intentional misalignment to compensate for the physical misalignment and damping asymmetry induced bias:

$$\bar{b} = \frac{(2\beta-1)\sin\rho}{\cos\rho} \rightarrow \beta = \frac{1}{2}\left(\frac{\bar{b}}{\tan\rho} + 1\right) \quad (14)$$

Effective misalignment (combined physical and intentional) by varying $\beta$ (and $\bar{b}$) such that $$\left[-\Delta\left(\frac{1}{\tau}\right)\sin(2\theta_\tau) - \frac{2(b-\bar{b})}{\tau}\right] = 0 \rightarrow B = 0 \quad (15)$$

Figure 6A:
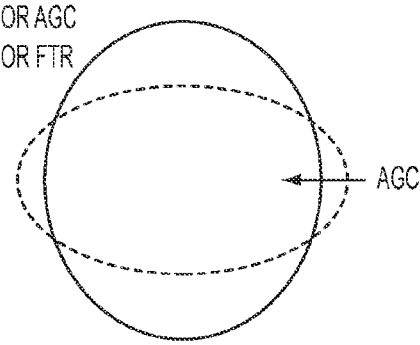
FIGS. 6A-6D show an example mode switching for the drive and sense axes of the CVG that can be used to correct for $2^{nd}$ mode actuation/pickoff misalignment, according to the present teachings.
Figure 6B:
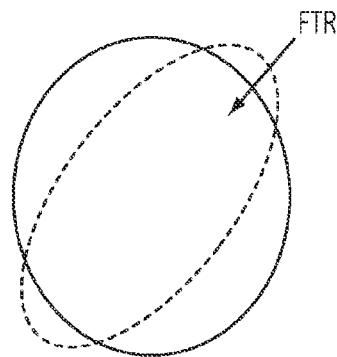
Figure 6C:
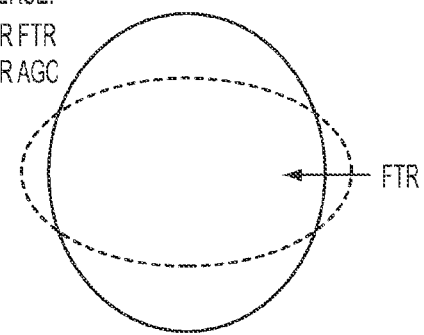
Figure 6D:
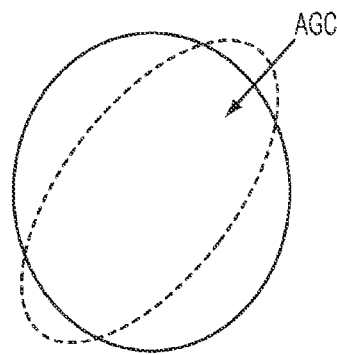

FIGS. 6A-6D show an example mode switching for the drive and sense axes of the CVG that can be used to correct for $2^{nd}$ mode actuation/pickoff misalignment, according to the present teachings. FIG. 6A shows the first vibration mode $\omega_1$ (AGC) along the drive axis and FIG. 6B show the second vibration mode $\omega_2$ (FTR) along the sense axis. The first plurality of actuators 410 and the second plurality of actuators 415 can be reversed, such that the second mode of vibration $\omega_2$ (FTR) is along the drive axis, as shown in FIG. 6C, and the first mode of vibration $\omega_1$ is along the sense axis, as shown in FIG. 6D.

In operation, a first control signal can be obtained from a controller to provide a voltage sufficient to cause and maintain the vibratory member to vibrate in a first mode of oscillation. A voltage can then be detected based on a second mode of oscillation of the vibratory member caused by a rotation of the CVG about an axis of rotation. A counter-balancing signal can then be provided that is sufficient to null the voltage based on the second mode of oscillation. A rate of the rotation of the CVG can then be determined based, in part, on the counter-balancing voltage.

The steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A Coriolis vibratory gyroscope ("CVG") comprising:
   a vibratory member;
   a controller;
   a first actuator and a second actuator electrically coupled to the vibratory member, wherein the first actuator and the second actuator are offset from a drive axis of the CVG, arranged on opposite sides of the drive axis, and operable to obtain a control signal from the controller and provide a first voltage to the controller sufficient to cause and maintain the vibratory member to vibrate in a first mode of oscillation; and
   a third actuator and a fourth actuator electrically coupled to the vibratory member, wherein the third actuator and the fourth actuator are offset from a sense axis of the CVG, arranged on opposite sides of the sense axis, and operable to detect a second voltage based on a second mode of oscillation of the vibratory member caused by a rotation of the CVG about an axis of rotation and provide a counter-balancing signal to the controller sufficient to nullify the second voltage based on the second mode of oscillation, wherein the sense axis is orthogonal to the drive axis in a modal reference frame,
   wherein the controller is operable to determine a rate of the rotation of the CVG based, in part, on the counter-balancing signal,
   wherein the controller is operable to modify the control signal to the first actuator or the second actuator by a corresponding first weighting factor or second weighting factor to compensate for misalignments in placement of the first actuator or the second actuator relative to the vibratory member.

2. The CVG of claim 1, wherein the vibratory member is symmetric relative to the sense axis and the drive axis.

3. The CVG of claim 1, wherein the controller is operable to modify the counter-balancing signal to the third actuator or the fourth actuator by a corresponding first or second weighting factor to compensate for misalignments in placement of the third actuator or the fourth actuator relative to the vibratory member.

4. The CVG of claim 3, wherein the controller is operable to preset the first weighting factor or the second weighting factor and the third weighting factor or the fourth weighting factor by a same amount.

5. The CVG of claim 3, wherein the controller is operable to adjust the third weighting factor or the fourth weighting factor and a physical misalignment and damping asymmetry such that a bias of the CVG is minimized or eliminated.

6. The CVG of claim 1, wherein the controller is operable to adjust the first weighting factor or the second weighting factor based on a detected misalignment between the control signal and a voltage measured at a pickoff associated with the drive axis.

7. The CVG of claim 1, wherein the controller is operable to adjust the third weighting factor or the fourth weighting factor and a physical misalignment and damping asymmetry such that a bias of the CVG is minimized or eliminated.

8. A method of compensating for bias in a Coriolis vibratory gyroscope ("CVG"), the CVG comprising a vibratory member, a controller, a first actuator and a second actuator coupled to the vibratory member, wherein the first actuator and the second actuator are offset from and on opposite sides of a drive axis of the CVG, and a third actuator and a fourth actuator coupled to the vibratory member, wherein the third actuator and the fourth actuator are offset from and on opposite sides of a sense axis of the CVG, wherein the drive axis and the sense axis are orthogonal to each other in a modal reference frame, the method comprising:
    obtaining, from the controller, a first control signal from the controller to provide a first voltage sufficient to cause and maintain the vibratory member to vibrate in a first mode of oscillation;
    detecting, by the controller, a second voltage based on a second mode of oscillation of the vibratory member caused by a rotation of the CVG about an axis of rotation;
    providing, by the controller, a counter-balancing signal sufficient to nullify the second voltage based on the second mode of oscillation;
    determining, by the controller, a rate of the rotation of the CVG based, in part, on the counter-balancing signal; and
    modifying, by the controller, the control signal to the first actuator or the second actuator by a corresponding first weighting factor or a second weighting factor to compensate for misalignments in placement of the first actuator or the second actuator relative to the vibratory member.

9. The method of claim 8, wherein the vibratory member is symmetric relative to the sense and the drive axis.

10. The method of claim 8, further comprising modifying, by the controller, the counter-balancing signal to the third actuator or the fourth actuator by a corresponding third weighting factor or a fourth weighting factor to compensate for misalignments in placement of the third actuator or the fourth actuator relative to the vibratory member.

11. The method of claim 10, further comprising setting, by the controller, the first weighting factor or the second weighting factor and the third weighting factor or the fourth weighting factor to a same amount.

12. The method of claim 10, further comprising adjusting, by the controller, the third weighting factor or the fourth weighting factor and a physical misalignment and damping asymmetry such that a bias of the CVG is minimized or eliminated.

13. The method of claim 8, further comprising adjusting, by the controller, the first weighting factor or the second weighting factor based on a detected misalignment between the control signal and a voltage measured at a pickoff associated with the drive axis.

14. The method of claim 8, further comprising adjusting, by the controller, the first weighting factor or the second weighting factor and a physical misalignment and damping asymmetry such that a bias of the CVG is minimized or eliminated.

* * * * *